Sept. 23, 1958     D. M. SOLENBERGER     2,853,135
MULTIPLE CUT-OFF TOOL

Filed Nov. 30, 1954     2 Sheets-Sheet 1

INVENTOR.
DEAN M. SOLENBERGER
BY Bosworth, Sessions,
Herstrom & Lawler
ATTORNEYS.

Sept. 23, 1958     D. M. SOLENBERGER     2,853,135
MULTIPLE CUT-OFF TOOL

Filed Nov. 30, 1954     2 Sheets-Sheet 2

INVENTOR.
DEAN M. SOLENBERGER
BY Bosworth, Sessions,
Herstrom & Lawler
ATTORNEYS.

United States Patent Office 2,853,135
Patented Sept. 23, 1958

2,853,135

MULTIPLE CUT-OFF TOOL

Dean M. Solenberger, Miami, Fla., assignor to Simplex Piston Ring Mfg. Company, a corporation of Ohio Application November 30, 1954, Serial No. 472,000

5 Claims. (Cl. 164—36)

This invention relates to cut-off tools and more particularly to an improved multiple cut-off tool for engine lathes or the like.

In the usual cutting off operation on a lathe the work is held in a chuck carried by the head stock of the lathe or on a mandrel supported on the lathe centers and a thin blade-like cut-off tool is fed transversely of the lathe axis into the work to effect the severing operation. It is desirable that the cut-off tool be as thin as possible in order to minimize scrap loss and the lack of strength resulting from this thinness has limited the distance the tool can be projected beyond its support or holder and consequently has also limited the depth of cut which might be made. As an alternative to performing the cut-off operation on a lathe it may also be carried out by means of a band saw, hack saw, or milling cutter. However, these cut-off procedures are restricted to the severing of one piece at a time and have other disadvantages which are objectionable for high production of accurate parts.

Accordingly it is an object of the present invention to provide an improved multiple cut-off tool for use on an engine lathe or the like whereby a plurality of parts may be simultaneously cut off from the stock and whereby extremly deep cuts may be performed without danger of tool breakage and while still maintaining the desired thinness of the individual cutting tools, thus keeping scrap at a minimum. Other objects of my invention are the provision of a multiple cut-off tool, particularly adapted for deep cuts, which can be readily mounted on the cross slide of an engine lathe, which permits the several tools to be sharpened simultaneously or individually, which provides means for readily adjusting the positions of the individual tools, and which is rugged in construction and may be economically produced.

The above and other objects of my invention will appear from the following description of one embodiment thereof, reference being had to the accompanying drawings in which.

Figure 1:
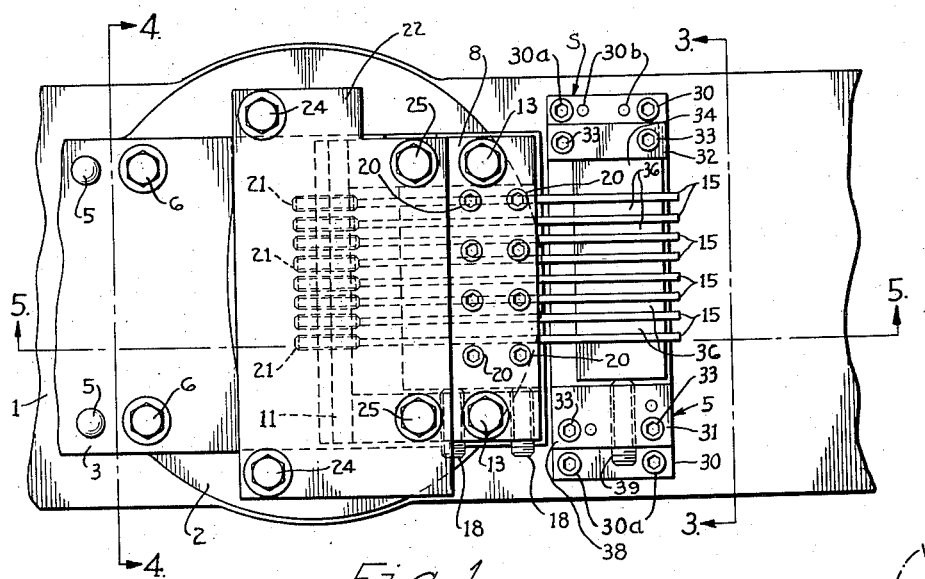
Figure 1 is a plan view of my improved multiple cut-off tool mounted on the cross slide of an engine lathe.

The lathe on which my cut-off tool is mounted may be of any suitable and well-known type and includes a cross slide 1 mounted on the bed of the lathe for feeding movement at right angles to the lathe axis. Mounted on the cross slide 1 is a compound slide base member 2 which carries the compound slide 3 in the usual manner. Although the compound slide 3 is normally movable relative to the cross slide 1 by a feed screw 4, when my multiple cut-off tool is used the compound slide 3, compound slide base 2, and cross slide 1 are preferably secured together against relative movement by taper pins 5 and screws 6 so that they will all move with the cross slide 1.

As illustrated, my multiple tool includes tool holder means generally indicated at T and supporting blade holder means generally indicated at S but it will be understood that for some applications the tool holder means and the supporting blade holder means may be made as an integral assembly.

The tool holder means T includes a base portion 7, a top portion 8, end blocks 9 and 10, and a rear plate 11 which is secured to the rear face of base 7 by a plurality of screws 12. The base 7, top 8 and end blocks 9 and 10 are secured together by screws 13 to form an open tool receiving box or housing. A lower hardened steel tool supporting plate 14 is supported in a recess on the top of the base 7. (see Figure 3) and a plurality of cut-off tools 15 are supported on the edge in side by side relation on said plate 14. Ase best seen in Figure 3, these tools 15 are spaced apart from each other by spacer blocks 16 of proper thickness to give the desired thickness to the parts being cut off. The filler block 17 merely fills any additional space in the holder box T and clamp screws 18 extend through end block 9 and serve, when tightened, to clamp the entire group of spacers 16 and tools 15 together in a horizontal direction.

The upper tool clamp plate 19 (Figure 3) is preferably of hardened steel, rests upon the top edges of the tools 15 and when top clamp screws 20 are tightened the tools are firmly held in a vertical direction. As will be noted from Figure 3 the spaced blocks 16 are preferably of slightly less height than the tools 15 so that the clamp plate 19 bears only on the cut-off tools 15.

The rear plate 11, which is attached to the base member 7 by screws 12, extends across the opening in the tool holder T but stops short of the top thereof to permit observation of the position of the rear ends of tools 15. Thus, as seen in Figure 4, the rear ends of the tools 15 and the rear edge of top clamp plate 19 are visible above the top edge of rear plate 11. A plurality of tool abutment and adjusting screws 21 extend through and have threaded engagement with the rear plate 11. These screws 21 are equal in number to the tools 15 and are disposed in alignment therewith. Thus, these screws 21 form adjustable abutments or back-up members for the rear ends of the tools. When the unit is assembled the tools are placed in position and, before the clamp screws 18 and 20 are completely tightened, the abutment screws 21 are so set that the cutting edges 15' of tools 15 (Figure 2) are disposed either on a line which is parallel to the lathe axis, as illustrated, or at a slight angle thereto as described and illustrated in my copending United States application, Serial No. 471,999, filed November 30, 1954, now Patent No. 2,789,641.

The assembled tool holder means T is secured in proper position on the top of the compound slide 3 by means of a plate 22 which overlies a portion of the top member 8 of tool holder T. The rear edge of plate 22 is supported at the proper distance above the compound slide base 2 by tubular spacers 23 through which screws 24 extend and have threaded engagement in the compound slide base 2. Screws 25 extend through the tool holder means T and have threaded engagement with clamp nuts 26 in the T-slot 27 in the compound slide 3. When the screws 25 are tightened the assembly T will be firmly clamped in position on the compound slide 3. If desired, taper pins or other locating means may be provided for facilitating accurate location of the assembly T on the compound slide 3 so that the tools 15 will project exactly at right angles to the lathe axis while being fed into the work.

Figure 2:
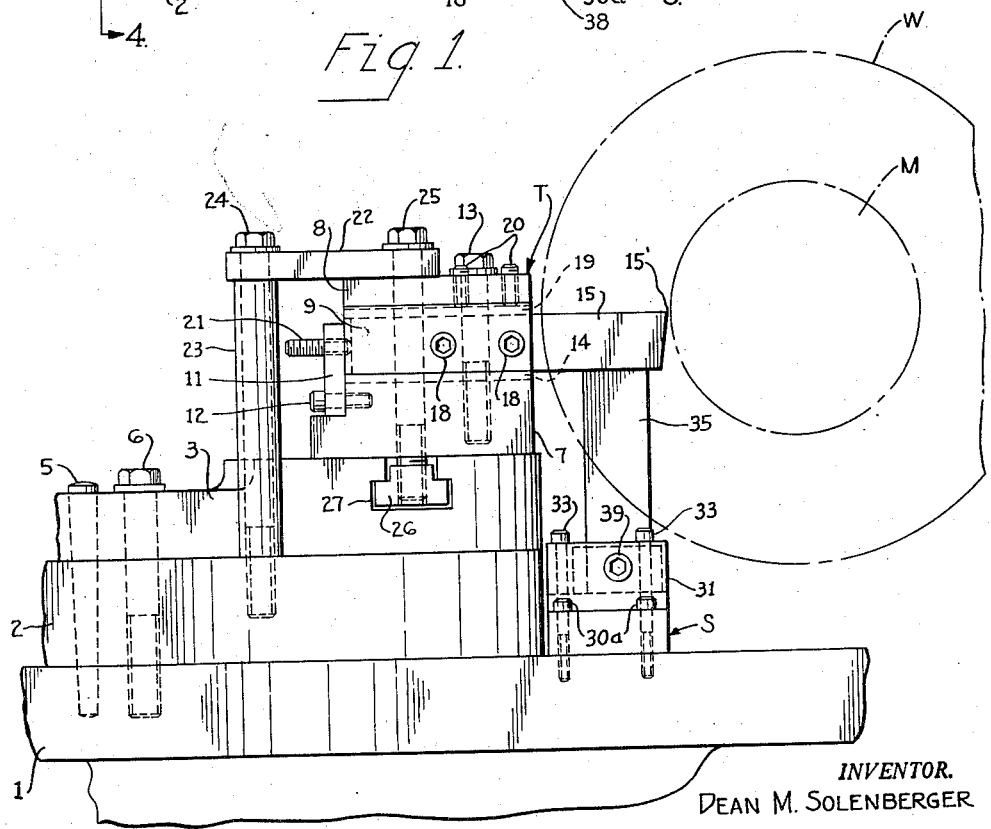
Figure 2 is an end elevation of the apparatus shown in Figure 1, the work piece being shown in phantom lines.
Figures 3, 4:
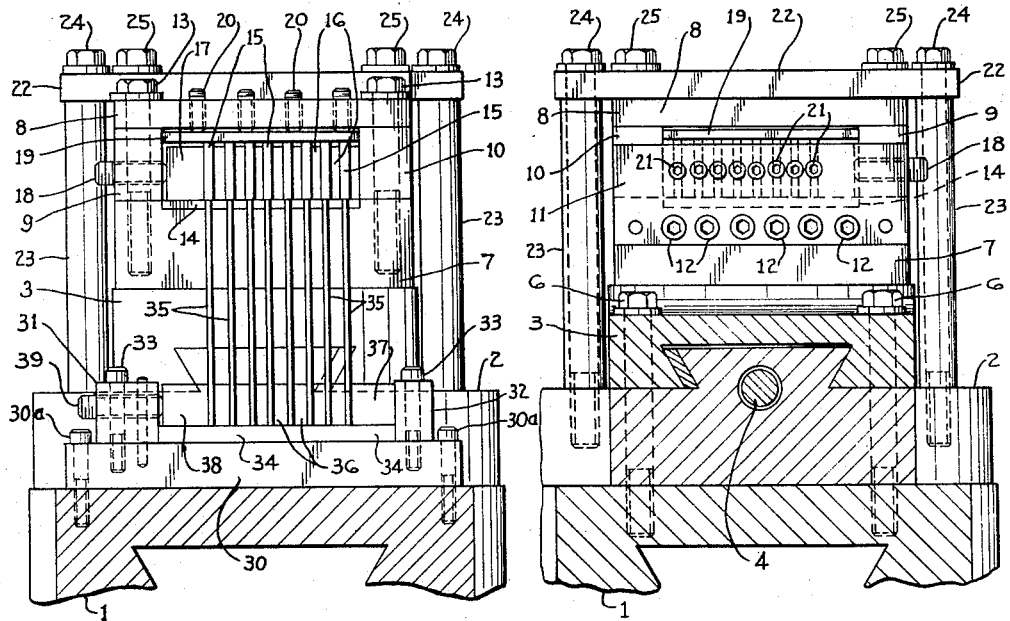
Figure 3 is a front elevation, taken substantially on line 3—3 of Figure 1.
Figure 4 is a rear elevation taken substantially on line 4—4 of Figure 1.
Figure 5:
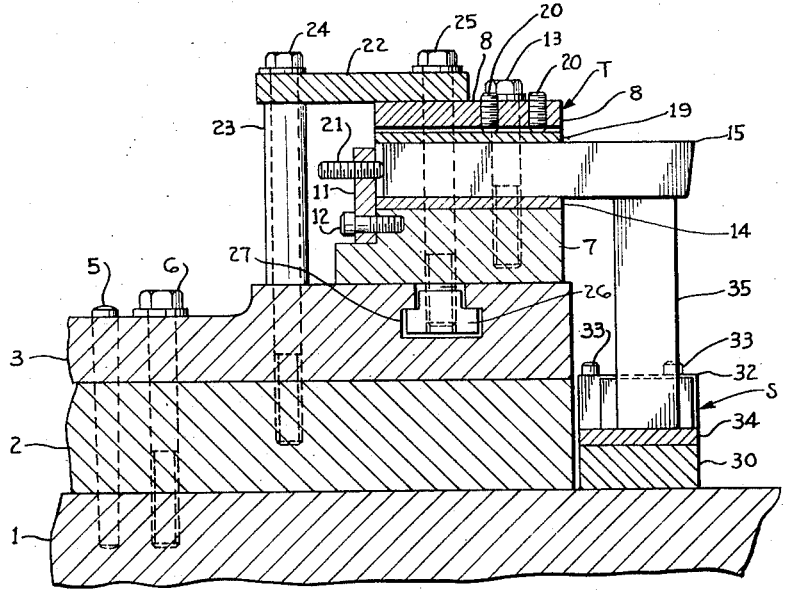
Figure 5 is a vertical cross-sectional view taken substantially on line 5—5 of Figure 1.

Referring particularly to Figure 2, I have illustrated my improved multiple cut-off tool as applied to severing a plurality of discs from a thick walled tubular work piece W which is mounted on a solid mandrel M carried in the usual manner on the lathe centers. The work piece W may for example be approximately eight inches in outside diameter and four inches in inside diameter thus leaving a wall thickness of approximately two inches through which the tools 15 must be fed. As the thickness of these tools is preferably only about .090 inch (in order to reduce scrap loss to a minimum) and as they are only approximately ⅝" deep, it will be apparent that, in order to produce the depth of cut illustrated they must extend at least two inches from the supporting holder T. Relatively heavy cuts must be effected in order to achieve satisfactory rates of production and accordingly I have provided means for supporting the long thin projecting ends of the tools 15, which supporting means will not interfere with the cutting operation but will provide adequate support for the overhanging ends of the individual tools 15.

Secured to the cross slide 1 just in advance of the compound slide base 2 is the supporting blade holder means generally indicated at S. This comprises a base portion 30, end blocks 31 and 32 secured to the base 30 by screws 33, and a bottom blade supporting plate 34, preferably of hardened steel. Screws 30$^a$ secure the blade holder assembly S to the cross slide 1 and taper pins 30$^b$ serve to locate the assembly properly relative to the line of travel of the cross slide. The vertically extending tool support blades 35 are disposed with their lower ends resting on the bottom support plate 34. These blades 35, as indicated in Figure 3, are slightly thinner than the projecting portions of tools 15 and they are mounted one directly below each of the tools 15. Spacers 36 serve to space blades 35 apart the proper distance and filler blocks 37 and 38 (Figure 3) locate the blades laterally in the proper positions so that they will be disposed immediately below the tools 15. The clamp screw 39 when tightened firmly secures the support blades 35 in the supporting blade holder means T.

As seen in Figure 2, the cutting edges 15' of the tools 15 have just about reached the inner end of their travel and the parts are almost severed from the work piece W. It will be understood that the depth of feed may be controlled so that the tool either just engages or stops just short of the mandrel M. When the cut is completed the mandrel is removed and the parts may then readily be separated, a band saw or other suitable means being employed to complete the cuts if stock is permitted to remain between the adjacent parts. The upper ends of the tool supports 35 engage the lower edges of their respective tools 15 and, as they are no thicker than the tools, and preferably thinner, the support blades 35 enter the tool cuts freely and without interference. As the cutting edges 15' of the tools 15 are preferably fed inwardly substantially on a horizontal plane through the center line of the work as indicated in Figure 2, the height of the tools 15 plus the height of the supports 35 must be greater than the depth of the cut being made. This is necessary in order to provide the unobstructed space between adjacent pairs of tools and tool supports sufficient to permit the cutting edge of the tool to be fed inwardly the required distance. Thus it may be stated that the free length of the support blades 35 above the spacers 36 must be sufficient, when added to the depth of the cut of the tool proper, to provide an unobstructed space between adjacent pairs of tools and blades which space is of a height greater than the maximum depth of cut which may be made by the tools.

When a tool sharpening operation is required, all of the tools 15 may be simultaneously ground by properly supporting the holder assembly T on the bed of a surface grinder and passing the grinding wheel across the tool ends, or, if only a few tools need sharpening, they may be individually removed by loosening clamp screws 18 and 20, sharpening the tools and returning them to holder T.

Before tightening clamp screws 18 and 20, the abutment screws 21 behind the blades which have been removed will be reset to realign the cutting edges of the sharpened tools with those which were not removed.

It has been previously noted that, for application to some types of lathes or for other reasons, it may in some instances be desirable to produce my improved multiple cut-off tool with the tool holding means and the support blade holding means as an integral unit or assembly rather than independently mounted on the lathe cross slide structure. Thus, although I have described the illustrated embodiment of my invention in considerable detail, it will be understood that variations and modifications may be made in the form and arrangement of the elements of my improved apparatus without departing from the spirit of my invention. I do not, therefore, wish to be limited to the exact structure herein shown and described but claim as my invention all embodiments thereof coming within the scope of the appended claims.

I claim:

1. A multiple tool for engine lathes or the like including tool holder means, a plurality of cut-off tools mounted in said tool holder means in side-by-side relation, said tools having projecting cutting edge carrying portions extending beyond said holder means with unobstructed space therebetween, a plurality of vertically extending tool support blades each having the same thickness, height and width, holder means for supporting said blades in side-by-side spaced relation with one blade below said projecting portion of each of said tools, each of said support blades having its upper end portion in engagement with the lower edge of said projecting portion of its respective tool, said blades being of less thickness than said tools and having unobstructed space therebetween to permit said blades to enter the cuts made by said tools, said blade holder means including a base portion of greater width than said blades in a direction longitudinally of said tools, spaced end block portions projecting upwardly from said base portion and of greater width than said blades in a direction longitudinally of said tools, spacer blocks adapted to locate said blades directly below said respective tools, and screw means extending through one of said spaced end blocks and adapted to exert transverse clamping pressure on said spacer blocks and tools whereby said blades may be clamped in fixed position while being adapted to be selectively positioned on said base portion in a direction longitudinally of said tools.

2. A multiple tool for engine lathes or the like including a plurality of cut-off tools, holder means for supporting said tools in side-by-side spaced relation with their cutting edges projecting beyond said holder means a distance equal to the maximum depth of cut to be made, means for individually adjusting the distance said cutting edges of said tools project beyond said holder, a plurality of tool support blades each having the same thickness, height and width equal in number to the number of said tools, holder means for supporting said blades in side-by-side spaced relation with one blade below each of said tools, said blades having their upper end portions in engagement with the lower edge of the respective tools, being of thickness not greater than said tools, and having free length sufficient to provide unobstructed space between adjacent pairs of tools and blades of a height greater than said maximum depth of cut to be made, said blade holder means including a base portion of greater width than said blades in a direction longitudinally of said tools, spaced end block portions projecting upwardly from said base portion and of greater width than said blades in a direction longitudinally of said tools, spacer blocks adapted to locate said blades directly below said respective tools, and screw means extending through one of said spaced end blocks and adapted to exert transverse clamping pressure on said spacer blocks and tools whereby said blades may be clamped in fixed position while being adapted to be selectively positioned on said base portion in a direction longitudinally of said tools.

3. A multiple tool for engine lathes or the like including a plurality of cut-off tools, holder means for supporting said tools in side-by-side relation, said tools having projecting cutting edge carrying portions extending beyond said holder means with unobstructed space therebetween for a distance equal to the maximum depth of cut to be made, a plurality of vertically extending tool support blades each having the same thickness, height and width, holder means for supporting said blades in side-by-side relation with one blade below each of said tools, each of said blades having an upper free end portion of thickness not greater than said tools and in engagement with the lower edge of its respective tool, said upper free end portions of said blades being spaced apart and of length sufficient to provide space between adjacent pairs of tools and blades which is unobstructed for a vertical distance greater than said maximum depth of cut to be made, said blade holder means including a base portion of greater width than said blades in a direction longitudinally of said tools, spaced end block portions projecting upwardly from said base portion and of greater width than said blades in a direction longitudinally of said tools, spacer blocks adapted to locate said blades directly below said respective toools, and screw means extending through one of said spaced end blocks and adapted to exert transverse clamping pressure on said spacer blocks and tools whereby said blades may be clamped in fixed position while being adapted to be selectively positioned on said base portion in a direction longitudinally of said tools.

4. In combination, a lathe having a cross slide, a tool holder supported on said cross slide, a plurality of horizontally extending cut-off tools mounted in said tool holder and having spaced apart projecting end portions extending equidistantly therefrom in side-by-side relation, a supporting blade holder mounted on said cross slide, and a plurality of spaced apart vertically extending supporting blades each having the same thickness, height and width mounted in said blade holder respectively below each of said cut-off tools, said blades having upper free ends engaging said tools and being of thickness not greater than said tools whereby said blades may freely enter the cuts made by said tools, said blade holder means including a base portion of greater width than said blades in a direction longtiudinally of said toools, spaced end block portions projecting upwardly from said base portion and of greater width than said blades in a direction longitudinally of said tools, spacer blocks adapted to locate said blades directly below said respective tools, and screw means extending through one of said spaced end blocks and adapted to exert transverse clamping pressure on said spacer blocks and tools whereby said blades may be clamped in fixed position while being adapted to be selectively positioned on said base portion in a direction longtudinally of said tools.

5. A multiple tool including a tool holder portion, a plurality of cut-off tools mounted in said tool holder portion and having spaced apart projecting end portions extending equidistantly therefrom in side-by-side relation, a supporting blade holder portion, a plurality of vertically extending supporting blades each having the same thickness, height and width mounted in said blade holder portion, and means for supporting said tool holder portion and blade holder portion with said supporting blades disposed respectively below said cut-off tools, said blades having upper free ends engaging said tools and being of thickness not greater than said tools whereby said blades may freely enter the cuts made by said tools, said blade holder means including a base portion of greater width than said blades in a direction longtudinally of said tools, spaced end block portions projecting upwardly from said base portion and of greater width than said blades in a direction longitudinally of said tools, spacer blocks adapted to locate said blades directly below said respective tools, and screw means extending through one of said spaced end blocks and adapted to exert transverse clamping pressure on said spacer blocks and tools whereby said blades may be clamped in fixed position while being adapted to be selectively positioned on said base portion in a direction longitudinally of said tools.

References Cited in the file of this patent

UNITED STATES PATENTS

| 361,707 | Matheis | Apr. 26, 1887 |
| 662,492 | Mingst | Nov. 23, 1900 |
| 1,187,099 | Rogers | June 13, 1916 |
| 2,310,153 | Rosenfarb | Feb. 2, 1943 |
| 2,658,418 | Hoelscher | Nov. 10, 1953 |
| 2,669,149 | Watson | Feb. 16, 1954 |

FOREIGN PATENTS

| 414,798 | Italy | Aug. 31, 1946 |